US011252033B1

(12) United States Patent
Melkild

(10) Patent No.: US 11,252,033 B1
(45) Date of Patent: *Feb. 15, 2022

(54) MONITORING VNFCS THAT ARE COMPOSED OF INDEPENDENTLY MANAGEABLE SOFTWARE MODULES

(71) Applicant: OPEN INVENTION NETWORK LLC, Durham, NC (US)

(72) Inventor: Keith William Melkild, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,588

(22) Filed: Oct. 19, 2020

Related U.S. Application Data

(63) Continuation of application No. 17/033,829, filed on Sep. 27, 2020, which is a continuation of application No. 16/421,302, filed on May 23, 2019, now abandoned.

(60) Provisional application No. 62/675,531, filed on May 23, 2018.

(51) Int. Cl.
*H04L 12/24* (2006.01)
*G06F 9/4401* (2018.01)
*G06F 9/455* (2018.01)

(52) U.S. Cl.
CPC .......... *H04L 41/082* (2013.01); *G06F 9/4416* (2013.01); *G06F 9/45558* (2013.01); *H04L 41/0886* (2013.01); *G06F 2009/45595* (2013.01)

(58) Field of Classification Search
None
See application file for complete search history.

(56) References Cited

U.S. PATENT DOCUMENTS

| 8,180,861 | B2 | 5/2012 | Hodgson et al. |
| 10,693,817 | B1 | 6/2020 | Melkild |
| 10,764,118 | B1 | 9/2020 | Melkild |
| 10,778,506 | B1 | 9/2020 | Melkild |
| 2003/0220986 | A1 | 11/2003 | Thakor |
| 2007/0171921 | A1 | 7/2007 | Wookey et al. |
| 2009/0210569 | A1 | 8/2009 | Lusetti et al. |
| 2010/0153941 | A1 | 6/2010 | Borissov et al. |

(Continued)

FOREIGN PATENT DOCUMENTS

CN 107436775 A 12/2017

OTHER PUBLICATIONS

Neves et al, "The SELFNET Approach for Autonomic Management in an NFV/SDN Networking Paradigm", Hindawi Publishing Corporation, International Journal of Distributed Sensor Networks, vol. 2016, Article ID 2897479, 17 pages (Year: 2016).

(Continued)

*Primary Examiner* — Scott B Christensen

(57) ABSTRACT

An example operation may include a method comprising one or more of receiving a VNFC module status request from a NFVO where the status request specifies a VNFC instance (VNFCI), determining a target OS installation of the VNFCI, retrieving a list of one or more VNFC modules of the VNFCI, determining the status of the one or more VNFC modules wherein the status determination includes at least one or more of constructing a default status command, adapting the command to the target OS, executing the adapted status command, and recording a normalized status result, sending a VNFC module status notification.

20 Claims, 11 Drawing Sheets

(56) References Cited

U.S. PATENT DOCUMENTS

| | | |
|---|---|---|
| 2013/0085880 A1 | 4/2013 | Roth et al. |
| 2013/0232463 A1 | 9/2013 | Nagaraja et al. |
| 2014/0359611 A1 | 12/2014 | Kutch |
| 2014/0380308 A1 | 12/2014 | Hassine et al. |
| 2015/0178118 A1 | 6/2015 | Morariu et al. |
| 2016/0048403 A1 | 2/2016 | Bugenhagen |
| 2016/0323200 A1 | 11/2016 | Xiang et al. |
| 2016/0328259 A1 | 11/2016 | Xia et al. |
| 2016/0328817 A1 | 11/2016 | Yin et al. |
| 2016/0337206 A1 | 11/2016 | Bugenhagen et al. |
| 2016/0373474 A1 | 12/2016 | Sood et al. |
| 2017/0006083 A1 | 1/2017 | McDonnell |
| 2017/0048165 A1 | 2/2017 | Yu et al. |
| 2017/0086111 A1 | 3/2017 | Vrzic et al. |
| 2017/0116019 A1 | 4/2017 | Miller |
| 2017/0139727 A1 | 5/2017 | Combellas et al. |
| 2017/0171102 A1 | 6/2017 | Parker et al. |
| 2017/0206115 A1 | 7/2017 | Shimojou et al. |
| 2017/0208011 A1 | 7/2017 | Bosch et al. |
| 2017/0214544 A1 | 7/2017 | Lin |
| 2017/0289060 A1 | 10/2017 | Aftab et al. |
| 2018/0063018 A1 | 3/2018 | Bosch et al. |
| 2018/0309626 A1 | 10/2018 | Andranov et al. |
| 2018/0309646 A1 | 10/2018 | Mustafiz et al. |
| 2018/0309824 A1 | 10/2018 | Gkellas et al. |
| 2018/0324261 A1 | 11/2018 | Yi et al. |
| 2019/0028350 A1 | 1/2019 | Yeung et al. |
| 2019/0146816 A1 | 5/2019 | Reno et al. |
| 2019/0171492 A1 | 6/2019 | Yousaf et al. |
| 2020/0174845 A1 | 6/2020 | Toeroe |
| 2020/0302051 A1 | 9/2020 | Li |

OTHER PUBLICATIONS

Bernini et al. "SELFNET Virtual Network Functions Manager: A Common Approach for Lifecycle Management of N FV Applications" 2016 5th IEEE international Conference on Cloud Networking, pp. 150-153 [retrieved from https://ieeexplore.ieee.org/stamp/stamp.jsp?tp=&arnumber=7776592]. (Year: 2016).

Chatras et al. ETSI NFV Architecture & Interfaces. 2016 (Year: 2016).

ETSI GS NFV-IFA 011 V2.4.1. Network Functions Virtualisation (NFV) Release 2; Management and Orchestration; VNF Descriptor and Packaging Specification (Feb. 2018). (Year: 2018).

ETSI GS NFV-REL 003 V1 .1.2. Network Functions Virtualisation (NFV); Reliability; Report on Models and Features for End-to-End Reliability. (Jul. 2016) (Year: 2016).

Alnaim et al., A Pattern for an NFV Virtual Machine Environment:, 2019 IEEE International Systems Conference 2019, pp. 1-6, doi: 10.1109/SYSCON.2019.8836847 (Year: 2019).

Kim et al., "A High Available Service Based on Virtualization Technology in NFV", ICOIN 2017, IEEE, pp. 649-652 (Year: 2017.

Wang et al, "Short Paper: Lightweight VN F Manager Solution for Virtual Functions", 2015 18th International Conference on Intelligence in Next Generation Networks, IEEE, pp. 148-150 (Year: 2015).

```
502 ──── !--- VNF.yaml (VNFD)
504 ──── !--- VNF.mf (manifest)
506 ──── !--- VNF.cert (signing certificate)
508 ──── !--- ChangeLog.txt
510 ──── !--- Licenses
512 ────────── !--- file(s)
514 ──── !--- Artifacts
516 ────────── !---- scripts
518 ──────────────── !---- file(s)
520 ────────── !-------- vdus
522 ────────────── !----- vduX
524 ───────────────────────────── !----- swImage
526 ──────────────────────────────────── !--- file(s)
528 ───────────────────────────── !------ swModules
530 ──────────────────────────────────── !------ modY
532 ─────────────────────────────────────────── !--- scripts
534 ─────────────────────────────────────────────────── !--- file(s)
536 ─────────────────────────────────────────── !--- swLoads
538 ─────────────────────────────────────────────────── !--- file(s)
```

FIG. 5

MONITORING VNFCS THAT ARE COMPOSED OF INDEPENDENTLY MANAGEABLE SOFTWARE MODULES

CROSS-REFERENCE TO RELATED APPLICATIONS

This application is a continuation of U.S. patent application Ser. No. 17/033,829, filed on Sep. 27, 2020, which is a continuation of U.S. patent application Ser. No. 16/421,302, filed on May 23, 2019, which claims priority to U.S. Provisional Application No. 62/675,531, filed on May 23, 2018, the entire disclosures of which are herein incorporated by reference.

TECHNICAL FIELD

This application generally relates to monitoring of Virtual Network Functions (VNFs) in a system employing a Network Function Virtualization (NFV) architecture. More specifically, the application relates to monitoring VNFs which include one or more Virtual Network Function Components (VNFCs) that is composed of independently manageable software modules, in an NFV architecture.

BACKGROUND

Network Function Virtualization (NFV) based architectures offer a way to design and deploy telecommunication network services. In the past, the functions that make up these services have been tightly coupled to the proprietary hardware on which they execute. NFV based architectures decouple the software implementation of these functions from the underlying infrastructure. The software typically runs in virtual machines or containers, under the control of a hypervisor or operating system which run on commercial off-the-shelf (COTS) servers. This approach has the promise of significant reductions in capital and operational expenses for service providers as custom hardware is no longer required and scaling is provided through additional software deployments, not a provisioning of new physical equipment.

The European Telecommunications Standard Institute (ETSI) network functions virtualization (NFV) industry specification group (ISG) has defined a reference NFV architecture. ETSI took an approach that enables existing management infrastructure such as Operational Support Systems (OSS)/Business Support Systems (BSS) and Element Management Systems (EMS) to remain in place. The standard is focused on getting Network Services (NSs) and Virtual Network Functions (VNFs) deployed on a cloud-based infrastructure, while leaving traditional Fault, Configuration, Accounting, Performance and Security (FCAPS) to be managed by EMS and OSS/BSS. Even with this focus, the details of many important aspects of the functionality are not specified.

SUMMARY

In an NFV architected system, functions that were tied to specialized hardware in the past are decoupled so that their software implementations can be executed in virtualized containers running on COTS hardware. These decupled software implementations are called Virtual Network Functions (VNFs). Each of these functions is made up of one or more software components which are known as VNF Components (VNFCs). In the current architectural standard, VNFCs are mapped one to one with a virtual machine/ container. Driven by this, lifecycle management (deploy, start, stop, kill, restart, etc.) commands target an entire VNFC VM/container.

While this level of management is certainly needed, it alone is not sufficient. VNFCs are often made up of multiple software modules, which typically consist one or more operating system processes. If a fault occurs in one of these modules, management of the module is often the most efficient way to resolve the issue with the VNFC, in terms of service impact. Given this, there exist a need to monitor VNFs which include one or more VNFCs composed of independently manageable software modules.

An example operation may include a method comprising one or more of receiving a VNFC module status request from a NFVO where the status request specifies a VNFC instance (VNFCI), determining a target OS installation of the VNFCI, retrieving a list of one or more VNFC modules of the VNFCI, determining the status of the one or more VNFC modules wherein the status determination includes at least one or more of constructing a default status command, adapting the command to the target OS, executing the adapted status command, and recording a normalized status result, sending a VNFC module status notification.

Another example may include a system comprising a Virtual Network Function Manager (VNFM) configured to perform one or more of receive a VNFC module status request from a NFVO where the status request specifies a VNFC instance (VNFCI), determine a target OS installation of the VNFCI, retrieve a list of one or more VNFC modules of the VNFCI, determine the status of the one or more VNFC modules wherein the status determination includes at least one or more of construct a default status command, adapt the command to the target OS, execute the adapted status command, and record a normalized status result, send a VNFC module status notification.

Another example may include non-transitory computer readable medium comprising instructions, that when read by a processor, cause the processor to perform one or more of receiving a VNFC module status request from a NFVO where the status request specifies a VNFC instance (VNFCI), determining a target OS installation of the VNFCI, retrieving a list of one or more VNFC modules of the VNFCI, determining the status of the one or more VNFC modules wherein the status determination includes at least one or more of constructing a default status command, adapting the command to the target OS, executing the adapted status command, and recording a normalized status result, sending a VNFC module status notification.

Yet another example operation may include a method comprising one or more of creating a VNFC monitor, starting a VNFC monitor, sending VNFCI state change notifications which includes a status of one or more VNFC modules, stopping a VNFC monitor, and destroying a VNFC monitor.

Yet another example operation may include a system comprising a Virtual Network Function Manager (VNFM) configured to perform one or more of create a VNFC monitor, start a VNFC monitor, send one or more VNFCI state change notifications which includes a status of one or more VNFC modules, stop a VNFC monitor, and destroy a VNFC monitor.

Yet another example operation may include a non-transitory computer readable medium comprising instructions, that when read by a processor, cause the processor to perform one or more of creating a VNFC monitor, starting a VNFC monitor, sending VNFCI state change notifications which includes a status of one or more VNFC modules, stopping a VNFC monitor, and destroying a VNFC monitor.

BRIEF DESCRIPTION OF THE DRAWINGS

FIG. 5 is a diagram of an embodiment of a VNF package archive in accordance with one or more embodiments.

DETAILED DESCRIPTION

Figure 1:
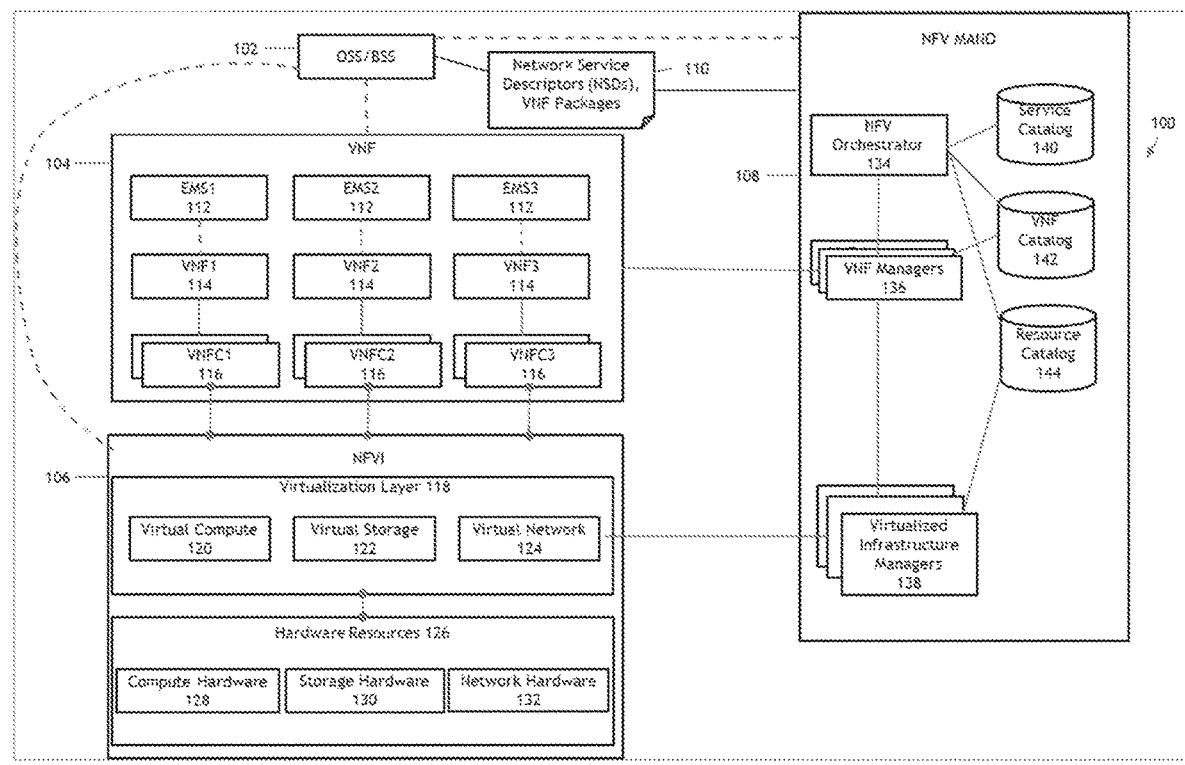
FIG. 1 is a diagram of an embodiment of a network function virtualization framework in accordance with one or more embodiments.

It will be readily understood that the instant components and/or steps, as generally described and illustrated in the figures herein, may be arranged and designed in a wide variety of different configurations. Thus, the following detailed description of the embodiments of at least one of a method, system, component and non-transitory computer readable medium, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Disclosed herein are various embodiments for implementing and/or utilizing lifecycle management of VNFC modules. A VNF is the implementation of a network function that can be deployed in an NFV architecture. VNFs can be viewed as service building blocks which may be used by one or more Network Services (NSs). Examples of VNFs include, but are not limited to, firewall, application acceleration, Deep Packet Inspection (DPI), Session Initiation Protocol (SIP) user agent, and Network Address Translation (NAT).

Each VNF specifies its deployment and operational behavior in a deployment template known as a VNF Descriptor (VNFD). This descriptor along with the VNF software bundle are delivered to an NFV management system in an archive known as a VNF Package. A VNF may be implemented using one or more VNF Components (VNFCs). A VNFC is an internal component of a VNF that provides a subset of that VNF's functionality. The main characteristic of a VNFC is that it maps 1:1 with a Virtual Machine (VM) or operating system container when the function is deployed. VNFCs are in turn made up of one or more software modules. Each module may spawn one or more operating system processes when deployed.

A VNF instance (VNFI) is a run-time instantiation of the VNF software resulting from completing the instantiation of its VNFCs and the connectivity between them. As multiple instances of a VNF can exist in the same domain, the terms VNF and VNF Instance (VNFI) may be used interchangeably herein. Similarly, VNFC instance (VNFCI) is a runtime instantiation of a VNFC deployed in a particular VM or container. It has a lifecycle dependency with its parent VNFI. As multiple instances of a VNFC can exist in the same domain, the terms VNFC and VNFC Instance (VNFCI) may also be used interchangeably herein.

FIG. 1 is a diagram of a network function virtualization framework 100 for implementing NFV in accordance with one or more embodiments of the present application. The NFV framework 100 comprises an operating support system (OSS)/business support system (BSS) module 102, a VNF module 104, a network function virtualization infrastructure (NFVI) model 106, and an NFV management and orchestration (MANO) module 108. A module may be a virtual element, a physical network element or embedded in a physical network element and may consist of hardware, software, firmware and/or a combination of one or more of hardware, software, and firmware. The OSS/BSS module 102 is configured to support management functions such as network inventory, service provisioning, networking configurations, and fault management. Further, the OSS/BSS module 102 is configured to support end-to-end telecommunication services. The OSS/BSS module 102 is configured to interact with the VNF module 104, the NFVI module 106 and the NFV MANO module 108. The VNF module 104 may comprise element management systems (EMSs) 112, VNFs 114 and VNFCs 116. The EMSs 112 may be applicable to specific VNFs and are configured to manage one or more VNFs 114 which may be composed of one or more VNFCs 116.

In one embodiment, the VNF module 104 may correspond with a network node in a system and may be free from hardware dependency. The NFVI module 106 is configured to provide virtual compute, storage and network resources to support the execution of the VNFs. The NFVI module 106 may comprise COTS hardware, accelerator components where necessary and/or a software layer which virtualizes and abstracts underlying hardware. For example, the NFVI module 106 may comprise one or more of a virtual compute module 120, a virtual storage module 122, a virtual networking module 124 and a virtualization layer 118. The virtualization layer 118 may be operably coupled to hardware resources 126 including, but not limited to compute hardware 128, storage hardware 130 and network hardware 132. The NFV MANO module 108 is configured to orchestrate and to manage physical and/or software resources that support the infrastructure virtualization. The NFV MANO module 108 is configured to implement virtualization specific management tasks for the NFV framework 100. The NFV MANO module 108 is supplied a set of VNF packages 110 each of which includes but is not limited to a VNF Descriptor (VNFD) and a VNF software bundle. This VNFD is a set of metadata that describes VNF to VNFC structure and underlying infrastructure requirements. Additionally, the MANO module 108 may be supplied a set of Network Service Descriptors (NSDs) 110, each of which is a set of metadata that describe the relationship between services, VNFs and any underlying infrastructure requirements. The NSDs and VNF packages 110 are owned by and stored in the OSS/BSS 102, but are used to interwork with the MANO module 108.

In one embodiment, the NFV MANO module comprises an NFV orchestrator (NFVO) module 134, a VNF manager (VNFM) 136, and a virtualized infrastructure manager (VIM) 138. The NFVO 134, the VNFM 136 and the VIM 138 are configured to interact with each other. Further, the VNFM 136 may be configured to interact with and to manage the VNF module 104 and the VIM 138 may be configured to interact with and manage the NFVI module 106. The orchestrator module 134 is responsible for the lifecycle management of network services. Supported lifecycle operations include one or more of instantiating, scaling, updating and terminating network services. The VNFM 136 is responsible for the lifecycle management for a set of VNFs 114 and all of their components (VNFCs) 116. Supported lifecycle operations include one or more of instantiating, scaling, updating and terminating VNFs. A VNFM may manage one or more types of VNFs 114. The VIM 138 is responsible for controlling and managing NFVI 106 compute, storage and network resources usually within an operator's infrastructure domain. Additionally, VIMs 138 may be partitioned based on an operator's Points of Presence (PoPs), i.e. physical locations. The service catalog 140, stores the network services which are managed by the orchestrator module 134. Each stored service may include, but is not limited to, the NSD 110 that defines the service. The VNF catalog 142 stores the VNFs which are used to build network services. Each stored VNF may include, but is not limited to, the VNF package 110 that includes the VNFD and VNF software bundle. This catalog is accessed by both the NFVO 134 and VNFM Managers 136. The resource catalog 144 stores the list of virtual and physical infrastructure resources in the NFVI 106 including the mapping between them. This catalog is accessed by both the NFVO 134 and the VIMs 138.

Figure 2:
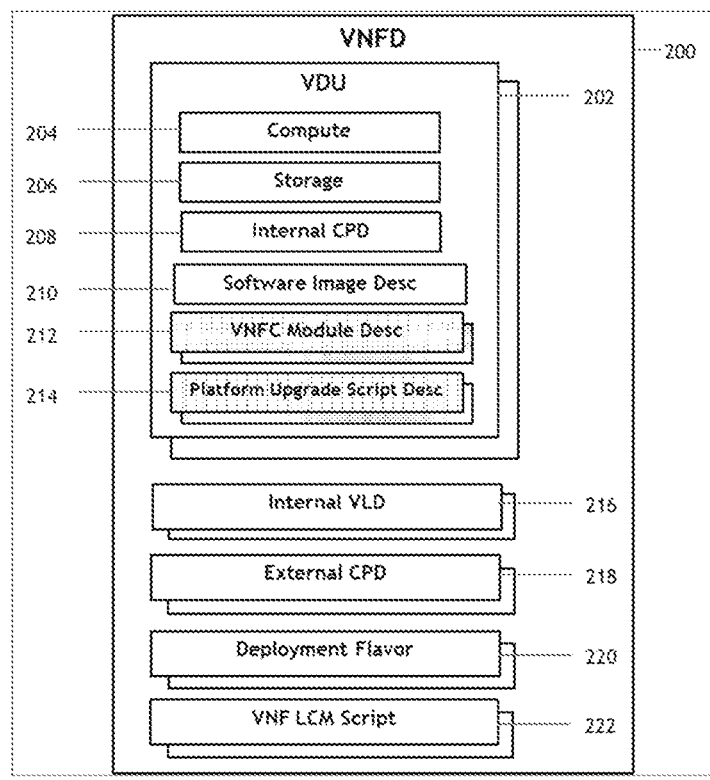
FIG. 2 is a diagram of an embodiment of a VNF descriptor in accordance with one or more embodiments.

FIG. 2 illustrates a VNF Descriptor (VNFD) 200 which defines the VNF properties and requirements for onboarding and management of a VNF in an NFV system 100 (See FIG. 1) in accordance with one or more embodiments of the present application. Each VNFD 200 includes VNF identification attributes including a globally unique id, a provider identifier, a product identifier and a software version. Additionally, a VNFD includes one or more Virtual Deployment Units (VDUs) 202. Each VDU 202 equates to a single VNFC 116 (See FIG. 1). Given this, each VDU 202 specifies the Compute 204 and Storage 206 resource requirements for running the VNFC. Additionally, the VDU 202 includes internal network Connection Point Descriptors (CPD) 208 which describe requirements for networking ports to be used for VNFC 116 (See FIG. 1) to VNFC communication. Further, a Software image descriptor 210 is included in the VDU 202. This image descriptor includes a reference to the location of the software image required to install the VNFC 116 (See FIG. 1). Typically, the location reference is internal to the VNF Package 110 (See FIG. 1), but the reference may also refer to an external source.

In accordance with one or more embodiments of the present application, each VNFC software image includes one or more software modules that comprise it. In order for these to be independently manageable, one or more VNFC Module Descriptors 212 are included in each VDU 202. Each VNFC Module Descriptor 212 includes the ID of software module within the VNFC and optionally, a list of references to VNFC module lifecycle management (LCM) scripts. In one embodiment, these scripts are included in the VNF package directly. In another embodiment these scripts are included in the VDU software image described by the software image descriptor 210. The module LCM scripts provide the ability to customize the handling of one or more module lifecycle events (start, stop, kill, etc.) beyond any standard mechanism being employed for VNFC modules.

In accordance with one or more embodiments of the present application, the VNFD 200 may include one or more platform upgrade script descriptors 214. Each platform upgrade script descriptor 214 provides a reference to a platform upgrade script included in the VNF Package 110 (See FIG. 1). These scripts may be used for upgrading the software platform in which the VNFC software modules execute.

In addition to the VDUs 202, the VNFD 200 also includes internal Virtual Link Descriptors (VLD) 216 which describe the network connectivity requirements between VNFCs within a VNF. Additionally, the VNFD 200 includes external network Connection Point Descriptors (CPD) 218 which describe requirements networking ports to be used for VNF 114 (See FIG. 1) communication. Further, the VNFD 200 includes descriptions of deployment flavors 220 which define size bounded deployment configurations related to capacity. Additionally, the VNFD 200 may include one or more VNF LCM script descriptors 222. Each VNF LCM script descriptor 222 provides a reference to a lifecycle script included in the VNF Package 110 (See FIG. 1).

Figure 3:
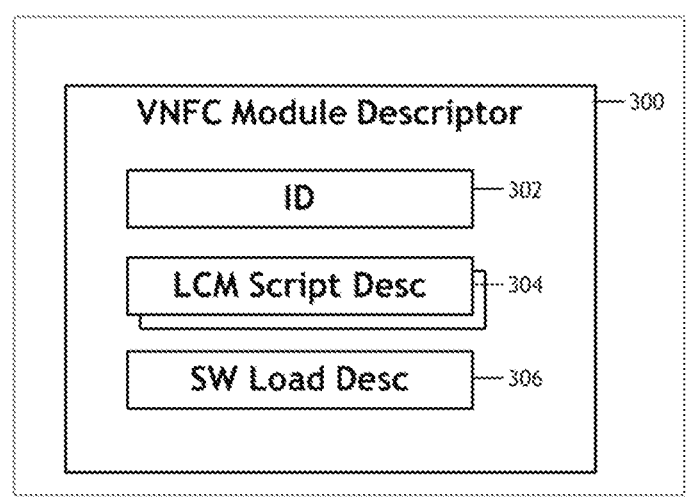
FIG. 3 is a diagram of an embodiment of a VNFC module descriptor in accordance with one or more embodiments.

FIG. 3 illustrates a VNFC Module Descriptor 300 which describes a software module that makes up part of a VNFC 116 (See FIG. 1) in accordance with one or more embodiments of the present application. The ID attribute 302 provides a unique identifier within the VNFC for referencing a particular module. In one embodiment this identifier 302 is used to specify a particular software module during a VNFC module lifecycle management operation (start, stop kill, etc.). In another embodiment, this identifier 302 is used to determine the location of a module-specific lifecycle management script within a VNF package 110 (See FIG. 1). Additionally, a VNFC Module Descriptor 300 may include one or more VNFC module specific lifecycle management script descriptors 304. Each LCM script descriptor 304 provides a reference to a VNFC module lifecycle script included in the VNF Package 110 (See FIG. 1). Further, a VNFC Module Descriptor 300 may also include a software load descriptor 306. A software load descriptor 306 provides a reference to a VNFC module software load included in the VNF Package 110 (See FIG. 1). Additionally, a VNFC Module Descriptor 300 may also include an order attribute 308. An order attribute may be used to control the start/stop order of the modules during VNF lifecycle operations such as instantiate and upgrade.

Figure 4:
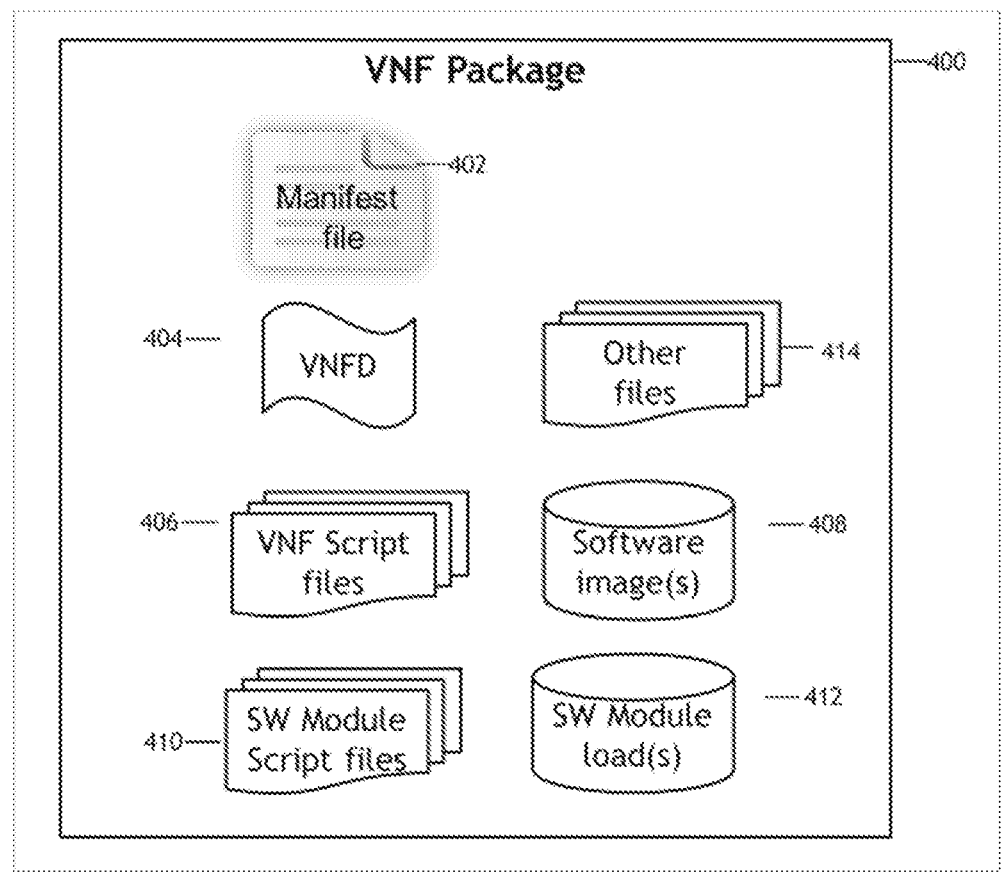
FIG. 4 is a diagram of an embodiment of a VNF package in accordance with one or more embodiments.

In accordance with one or more embodiments of the present application, FIG. 4 illustrates a VNF Package 400 which includes the requirements, configuration and software images required to onboard a VNF 114 (See FIG. 1) in an NFV system 100 (See FIG. 1). The VNF package is delivered by a VNF provider as a whole and is immutable. The package is digitally signed to protect it from modification. VNF Packages 400 are stored in a VNF Catalog 142 (See FIG. 1) in an NFV System 100 (See FIG. 1). Each package contains a manifest file 402 which specifies the list of contents it contains. Further, the package 400 contains a VNFD 404, which as described in FIG. 3, includes the metadata for VNF onboarding and lifecycle management. Additionally, any VNF specific lifecycle management (onboard, deploy, start, etc.) scripts 406 are included. The actual binary software images for each VNFC (VDU) 408 are also supplied. In many embodiments, each binary software image is that of a complete VM/container as the VDU maps 1:1 with a VM/container. In accordance with one or more embodiments of the present application, the VNF package 400 may also contain any VNFC module specific lifecycle script files 410 supplied by the VNF provider. Further, in accordance with one or more embodiments of the present application, the VNF package 400 may also contain any VNFC module software loads 412 supplied by the VNF provider. These VNFC module software loads 410 are useful during upgrade scenarios, as it may be desirable to upgrade an individual VNFC module instead of the entire VNFC. It should be noted that in some embodiments, in order to ease and expedite initial deployment, the VNFC module scripts 410 and software loads 412 are also included in the VNFC/VDU software image binary file 408, which at minimum includes the underlying filesystem and software platform. Further, in accordance with one or more embodiments of the present application, the VNF package 400 may also contain platform upgrade scripts 414 supplied by the VNF provider. These platform upgrade scripts 414 enable platform changes which may be required in order to run a newer version of one or more VNFC software modules. Additionally, the VNF package may include other files 416, which may consist of, but are not limited to, test files, license files and change log files.

In accordance with one or more embodiments of the present application, FIG. 5 illustrates a VNF Package Archive 500 which is a compressed collection of the contents of a VNF Package 400 (See FIG. 4). In one embodiment, the Cloud Service Archive (CSAR) format is used for delivery of VNF packages 400 (See FIG. 4). A CSAR file is a zip file with a well-defined structure. In one embodiment the CSAR file structure conforms to a version of the Topology and Orchestration Specification for Cloud Application (TOSCA) standards. In one embodiment, the VNF package archive 500 conforms to a version of the TOSCA Simple Profile for NFV specification.

The exemplary VNF Package Archive 500 embodiment includes a VNFD specification file 502. In one embodiment, this file is expressed in Yet Another Modeling Language (YAML). The name of the file will reflect the VNF being delivered. Additionally, the package archive 500 may include a manifest file 504, which lists the entire contents of the archive. In one embodiment, the manifest 504 will also include a hash of each included file. Further, a signing certificate, including a VNF provider public key, may also be included 506 to enable verification of the signed artifacts in the archive 500. Additionally, a change log file 508 may be included that lists the changes between versions of the VNF. A licenses directory 510 may also be included that holds the license files 512 for all the applicable software component contained in the various software images 526. An artifacts directory 514 may be present to hold scripts and binary software images delivered in this package archive 500. Under the artifacts directory, a scripts directory 516 may be present to hold the VNF lifecycle management scripts 518.

In accordance with one or more embodiments of the present application, the archive 500 may include a hierarchical directory structure 520 for organization of all VDU artifacts under the artifacts directory 514. Under directory 520 may be a directory 522 for each specific VDU/VNFC. Under directory 522 may be a directory 524 for VDU/VNFC software image files 526. Additionally, there may be a software modules directory 528 which contains lifecycle management scripts for all VNFC software modules. Under directory 528 may be a directory 530 for each specific VNFC module. In one embodiment, the name of directory 530 will match that of the ID field 302 (See FIG. 3) of the applicable VNFC Module descriptor. Under the artifacts directory, a scripts directory 532 may be present to hold VNFC module lifecycle management scripts 534. Additionally, a software loads directory 536 may be present to hold VNFC module software loads 538. Further, there may be a platform directory 540 under a specific VDU directory 522 which contains a scripts directory 542 that holds VDU platform upgrade scripts 544.

It should be understood that though a very hierarchical organization structure is depicted in this embodiment, other embodiments with flatter organization structures are equally applicable so long as the corresponding load and script descriptors in the VNFD 404 (See FIG. 4) reflect the correct location.

Figure 6:
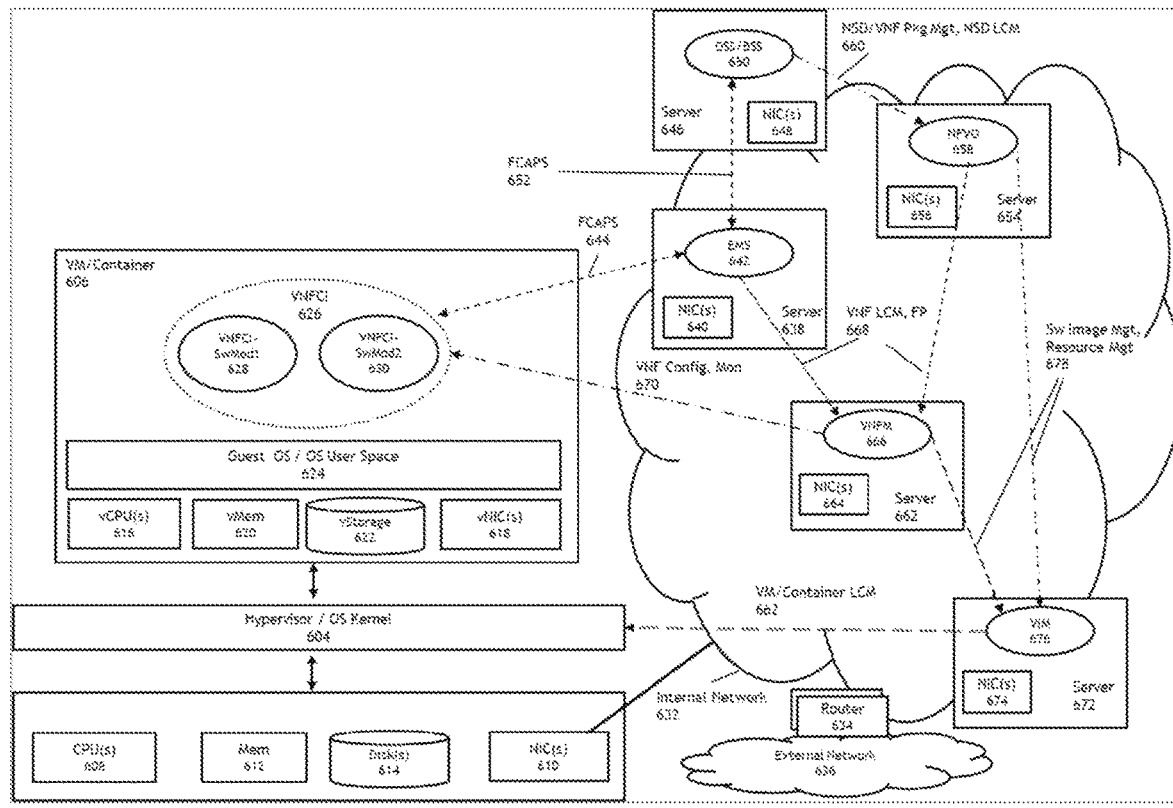
FIG. 6 is a diagram of an embodiment of a deployment of a VNFCI with multiple software modules.

FIG. 6 illustrates an NFV system 600 hosting a VNFC composed of one or more software modules in accordance with one or more embodiments of the present application. The NFV system 600 is comprised of at least one physical compute node 602. In one embodiment, the compute node 602 hosts a hypervisor 604, which in turn manage one or more Virtual Machines (VMs) 606. In another embodiment, the compute node 602, hosts operating systems (OSs) 604 which manage one or more containers 606. Both embodiments provide virtualization environments in which the VNF Component Instance (VNFCI) 626 resides. As the virtualization environment provided by both embodiments is sufficient for execution, the two embodiments should be considered interchangeable herein. In accordance with one or more embodiments of the present application, the VNFCI 626 is composed of multiple software modules 628 and 630, each of which executes in VM/Container 606.

Compute node 602 is comprised of a Central Processing Unit (CPU) module 608, a memory module 612, a disk module 614 and a network interface card (NIC) module 610. As further shown in FIG. 6, NIC 610 communicate network packets via a physical internal network 632, where in accordance with one or more preferred embodiments network 632 may be a private network. The internal network may be connected to an external physical network 636 via, for example, one or more network routers 634.

Each VM/container 606 is comprised of a series of virtual resources that map to a subset of the physical resources on the compute nodes 602. Each VM/container is assigned one or more virtual CPUs (vCPUs) 616, an amount of virtual memory (vMem) 620, an amount of virtual storage (vStorage) 6222 and one or more virtual NICs (vNIC) 618. A vCPU 616 represents a portion or share of a physical CPU 608 that are assigned to a VM or container. A vMem 620 represents a portion of volatile memory (e.g. Random Access Memory) 612 dedicated to a VM or container. The storage provided by physical disks 614 are divided and assigned to VMs/containers as needed in the form of vStorage 622. A vNIC 618 is a virtual NIC based on a physical NIC 610. Each vNIC is assigned a media access control (MAC) address which is used to route packets to an appropriate VM or container. A physical NIC 610 can host many vNICs 618.

In the case of a VM, a complete guest operating system 624 runs on top of the virtual resources 616-622. In the case of an operating system container, each container includes a separate operating system user space 624, but shares an underlying OS kernel 604. In either embodiment, typical user space operating system capabilities such as secure shell and service management are available.

A VNFC instance (VNFCI) 626 resides in VM/container 606. In accordance with one or more embodiments of the present application, the VNFCI 626 is composed of multiple software modules 628 and 630, each of which executes in VM/Container 606. In one embodiment a VNFCI software module 628 or 630 may be installed and managed as an operating system service. In another embodiment, a VNFCI software module 628 or 630 may be managed by a local NFV based software agent. Additionally, a VNFCI software module 628 or 630 may consist of one or more operating system processes.

In one embodiment, a server 638 hosts an EMS 642 which is responsible for one or more of fault, configuration, accounting, performance and security (FCAPS) of one or more VNFCIs 626. The server 638 has one or more NICs 640 which provide connectivity to an internal network 632 over which all messages 644 travel. There may be many EMSs in a system 600. An EMS 642 sends and receives FCAPS messages 644 from all VNFCIs 626 that it is managing.

In one embodiment, a server 646 hosts an OSS/BSS 650 which is responsible for managing an entire network. It is responsible for consolidation of fault, configuration, accounting, performance and security (FCAPS) from one or more EMSs 642. The server 646 has one or more NICs 648 which provide connectivity to an internal network 632 over which all incoming and outgoing messages travel. Additionally, the OSS/BSS 650 understands and manages connectivity between elements (VNFCs in this case), which is traditionally beyond the scope of an EMS 642. In accordance with one or more embodiments of the present application, an OSS/BSS 650 also manages network services and VNFs through an NFVO 660.

In accordance with one or more embodiments of the present application, a server 654 hosts an NFVO 658, which is responsible for service and VNF orchestration in the NFV system 600. The server 654 has one or more NICs 656 which provide connectivity to an internal network 632 over which over which all incoming and outgoing messages travel. The NFVO provides an interface 660 for management of Network Service Descriptors (NSDs) and VNF Packages 110 (See FIG. 1). In one embodiment VNF packages are provided in accordance with VNF Package format 400 (see FIG. 4). In another embodiment VNF packages are stored in a VNF catalog 142 (See FIG. 1) by the NFVO 660. Additionally, the NFVO provides an interface 660 for Network Service (NS) Lifecycle Management (LCM) which is utilized by the OSS/BSS 650 to instantiate, scale, etc. network services.

In accordance with one or more embodiments of the present application, a server 662 hosts a VNFM 666, which is responsible for managing one or more VNFs 114 (See FIG. 1) in the NFV system 600. The server 662 has one or more NICs 664 which provide connectivity to an internal network 632 over which all message travel. There may be many VNFMs 666 in a system 600. The VNFM 666 provides VNF LCM, fault and performance interfaces 668 which are utilized by the NFVO 658 and EMS 642 to instantiate, start, stop, etc. VNFs. In one embodiment, the VNFM 666 retrieves VNF packages 400 (See FIG. 4) directly from a VNF catalog 142 (See FIG. 1) in order to instantiate a VNF. In another embodiment, the VNFM 666 caches VNF packages 400 (See FIG. 4) of managed VNFs for efficient access. In a preferred embodiment, VNF LCM interface 668 provide additional commands for LCM of VNFC software modules. Further, once a VNF is instantiated, the VNFM 666 may monitor it and update its configuration based on interfaces that it is required to provide. As each VNF is comprised of one or more VNFCs, the configuration and monitoring interface must be implemented on at least one of the VNFCs. Given this, the interfaces 670 are instantiated in one or more VNFCIs 626.

In one embodiment, a server 672 hosts a VIM 676 which is responsible for managing the virtualized infrastructure of the NFV System 600. The server 672 has one or more NICs 674 which provide connectivity to an internal network 632 over which all messages travel. There may be many VIMs 676 in a system 600. The VIM 676 provides software image and resource management interfaces 678 which are utilized by the NFVO 658 and VNFM 666. In a preferred embodiment, the VIM 676 extracts and caches software images stored in VNF Packages 400 (See FIG. 4) in order expedite the deployment process. In order to fulfill a resource management request, a VIM 676 may need to manage a compute node 602, hypervisor/OS 604, VM 606, network 662 switch, router 634 or any other physical or logical element that is part of the NFV System 600 infrastructure. In one embodiment, a VIM 676 will query the states of requisite logical and physical elements when a resource management request is received from a VNFM 666 or NFVO 658. This embodiment may not be efficient however given the elapsed time between state requests and responses. In another embodiment, a VIM 676 will keep a current view of the states of all physical and logical elements that it manages in order to enable efficient processing when element states are involved. Further, it is expected that a VNFM 666 will maintain a cache of those element states that are associated with VNFCIs 626 that it is managing, in order to enable efficient processing when element states are involved.

Figure 7:
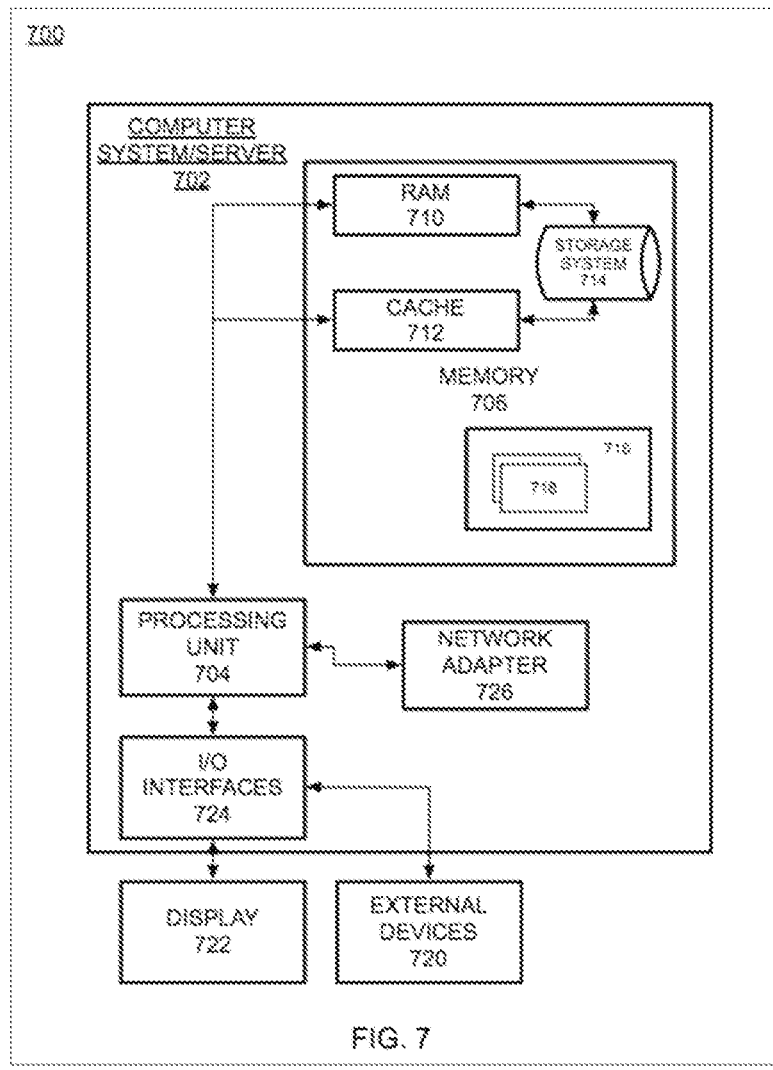
FIG. 7 is a diagram of an embodiment of a standard hardware diagram in accordance with one or more embodiments.

FIG. 7 illustrates one example of a computing node 700 to support one or more of the example embodiments. This is not intended to suggest any limitation as to the scope of use or functionality of the embodiments described herein. Regardless, the computing node 700 is capable of being implemented and/or performing any of the functionalities or embodiments set forth herein.

In computing node 700 there is a computer system/server 702, which is operational with numerous other general purposes or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus 708 that couples various system components including system memory 706 to processor 704.

Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and nonvolatile media, removable and non-removable media.

The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of various embodiments as described herein.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments as described herein.

Aspects of the various embodiments described herein may be embodied as a system, method, component or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

In general, the routines executed to implement the embodiments, whether implemented as part of an operating system or a specific application; component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the embodiments. Moreover, while the embodiments have and herein will be described in the context of fully functioning computers and computer systems, the various embodiments are capable of being distributed as a program product in a variety of forms, and that the embodiments apply equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described herein may be identified based upon the application or software component within which it is implemented in specific embodiments. However, it should be appreciated that any particular program nomenclature used herein is merely for convenience, and thus the embodiments should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the embodiments are not limited to the specific organization and allocation of program functionality described herein.

The exemplary environment illustrated in FIG. 7 is not intended to limit the present embodiments. Indeed, other alternative hardware and/or software environments may be used without departing from the scope of the embodiments described herein.

Figure 8:
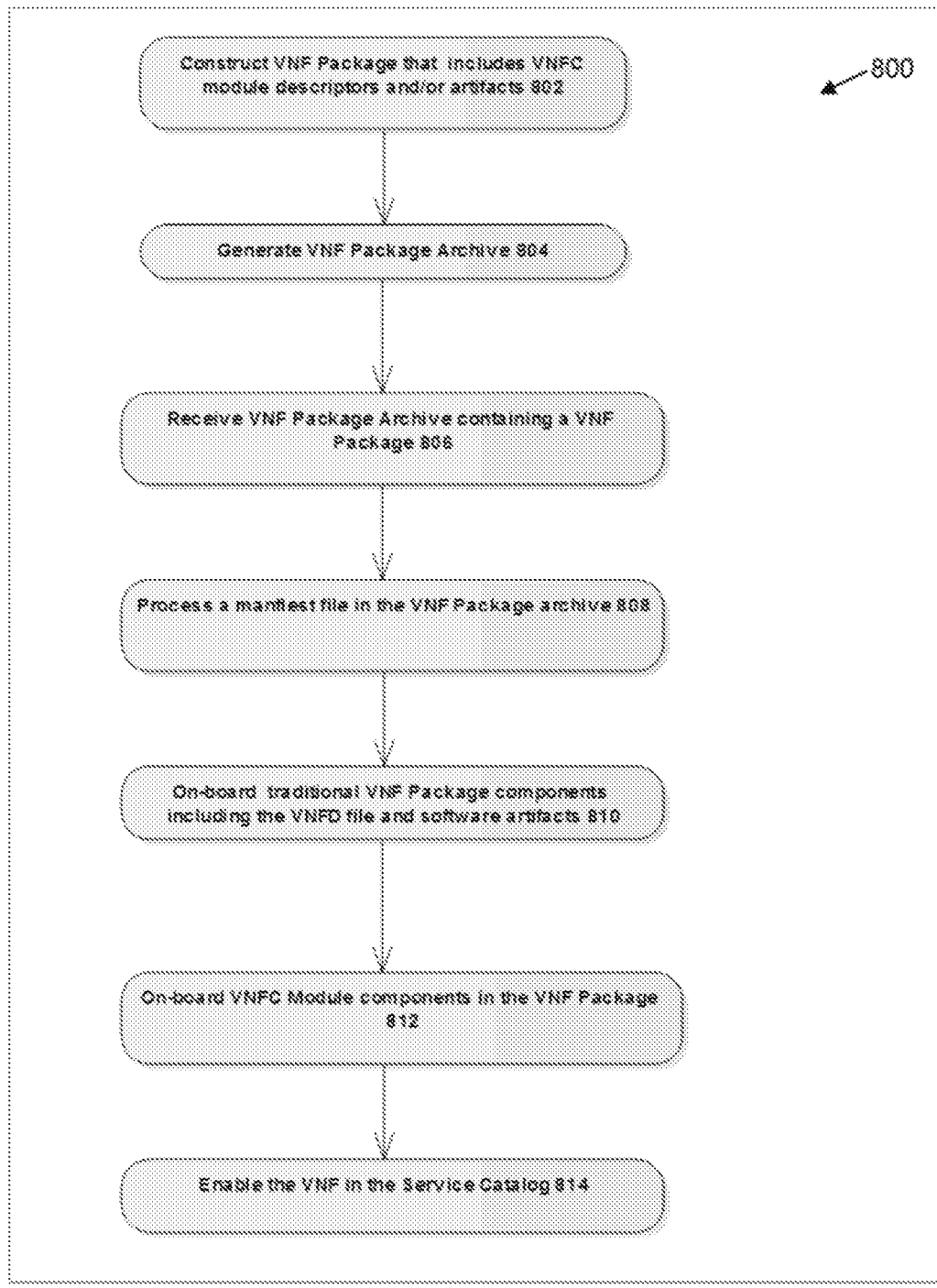
FIG. 8 is a diagram of an embodiment of a VNF onboarding flow chart in accordance with one or more embodiments.

In accordance with one or more embodiments of the present application, FIG. 8 illustrates a VNF onboarding process 800 for a VNF which include one or more VNFCs composed of independently manageable software modules. A VNF provider constructs a VNF package 802 that includes at least one of a VNFD 200 (See FIG. 2) with one or more VNFC module descriptors 300 (See FIG. 3) or one or more VNFC module artifacts 410-412 (See FIG. 4). In one embodiment, the VNFD is constructed as described in FIG. 2. In another embodiment, the VNFC module descriptors are constructed as described in FIG. 3. In one embodiment, the VNF Package includes one or more VNFC module lifecycle management scripts 410 (See FIG. 4). In another embodiment, the VNF package includes one or more VNFC module software loads 412 (See FIG. 4).

Once the VNF package 400 (See FIG. 4) has been constructed, the VNF provider generates an archive 804 that contains the contents in compliance with the requirements of the destination NFVO 658 (See FIG. 6). In accordance with one or more embodiments of the present application, the archive may reflect the exemplary embodiment depicted in FIG. 5. In one embodiment, the archive may be in the Cloud Service Archive (CSAR) format.

In step 806, an NFVO 658 (See FIG. 6) receives the VNF Package Archive 500 (See FIG. 5) from an OSS/BSS 650 (See FIG. 6), which includes a VNF Package 400 (See FIG. 4). In one embodiment, the archive is received by a package management system included within the NFVO 658 (See FIG. 6).

Once the package archive is received by the NFVO 658 (See FIG. 6), the manifest file 504 (See FIG. 5) is located and processed 808. If the manifest file is not found, then processing of the archive ceases. If it is found, then the signing certificate 506 (See FIG. 5) is processed. Additionally, the NFVO 658 (See FIG. 6) may perform other security checks based on checksum, digest, etc. files contained in the archive against the trusted manifest file.

In step 810, the NFVO 658 (See FIG. 6)/134 (See FIG. 1) on-boards the traditional VNF package components. The VNFD file 502 (See FIG. 5) is first located and extracted from the VNF Package Archive 500 (See FIG. 5). In one embodiment, the NFVO may process the identification attributes in the VNFD file 502 (See FIG. 5), to see if the VNFD 200 (See FIG. 2) has been previously on-boarded into the VNF catalog 142 (See FIG. 1). If the VNF identifier plus version are identical to what is in the catalog, then the VNF Provider may be prompted to confirm whether or not to continue, as this will result in a VNF package overwrite. If a VNFD file 502 (See FIG. 5) under the same identification attributes is found, but the version is newer, then the NFVO 134 (See FIG. 1) may process this as a package update instead of as a package addition. In accordance with one or more embodiments of the present application, the VNFD file 502 (See FIG. 5) may include one or more VNFC module descriptors 212 (See FIG. 2).

Once the VNFD file 502 (See FIG. 5) is on-boarded, additional VNF package components 406-414 (See FIG. 4) are located and processed. In some embodiments, the NFVO 134 (See FIG. 1) loads VNFC software images and/or lifecycle management scripts 406-408 (See FIG. 4). In one embodiment, these artifacts are extracted from the archive 500 (See FIG. 5) and stored along with the VNFD file in the VNF catalog 142 (See FIG. 1). In another embodiment, one or more of these artifacts may be stored in another database, and an external reference is added to the VNF entry in the VNF catalog 142 (See FIG. 1). In some cases, the VDU (VNFC) software image reference 210 (See FIG. 2) may specify an external source. In such an embodiment, the software image may be uploaded from the source and stored in the VNF catalog 142 (See FIG. 1) for efficient, localized access.

In step 812, and in accordance with one or more embodiments of the present application, VNFC software module components are located and processed. In some embodiments, the NFVO 134 (See FIG. 1) loads VNFC module software loads and/or lifecycle management scripts 410-412 (See FIG. 4). In one embodiment, these artifacts are extracted from the archive 500 (See FIG. 5) and stored along with the VNFD file in the VNF catalog 142 (See FIG. 1). In another embodiment, one or more of these artifacts may be stored in another database, and an external reference is added to the VNF entry in the VNF catalog 142 (See FIG. 1). In some cases, the VNFC module software load reference 306 (See FIG. 3) may specify an external source. In such an embodiment, the software load may be uploaded from the source and stored in the VNF catalog 142 (See FIG. 1) for efficient, localized access.

In step 814, the VNFD in enabled in the service catalog 140 (See FIG. 1). In some embodiments, the NFVO 134 (See FIG. 1) automatically enables the VNFD once the on-boarding process has completed.

Figure 9:
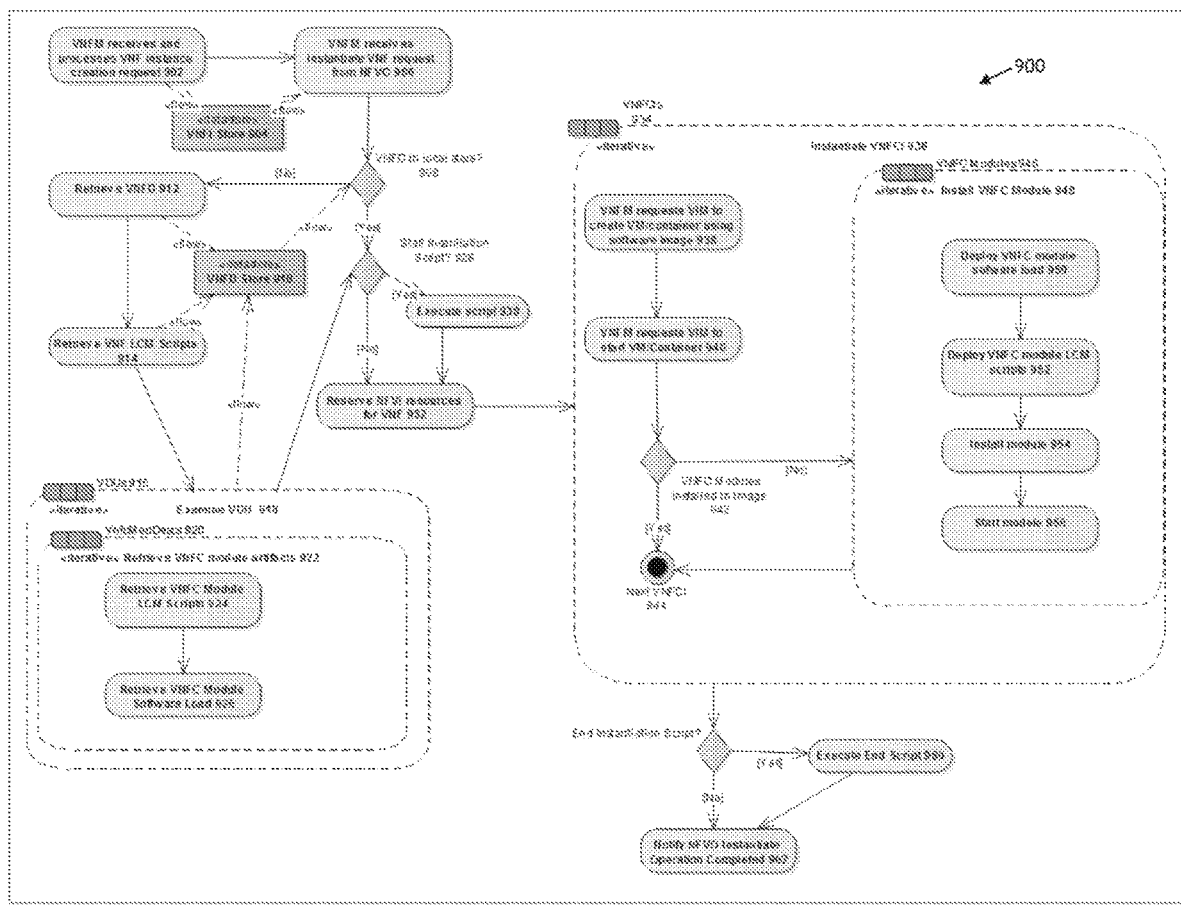
FIG. 9 is a diagram of an embodiment of a VNF instantiation flow chart in accordance with one or more embodiments.

In accordance with one or more embodiments of the present application, FIG. 9 illustrates a VNF instantiation process 900 for a VNF which include one or more VNFCs composed of independently manageable software modules. Prior to this process, it is expected that the VNF package has been on-boarded as described by process 800 (see FIG. 8) or is otherwise functional.

The process starts in step 902 with a VNFM 666 (See FIG. 6) receiving a VNF creation request from an NFVO 658 (See FIG. 6). The creation request includes the ID of the VNFD 200 (See FIG. 2), which was stored in the VNF catalog 142 (See FIG. 1) as part of the onboarding process 800 (see FIG. 8). The VNFM 666 (See FIG. 6) creates a new VNF instance ID, records it and the VNFD ID in a VNFI record in a VNFI store 904, and sends a response to the NFVO 658 (See FIG. 6) with the ID. In some embodiments, the VNFI store is a database.

In step 906, the VNFM 666 (See FIG. 6) receives a VNF instantiation request from the NFVO 658 (See FIG. 6), which includes the VNF instance ID created in the previous step, along with other parameters which may include, but is not limited to, preferred deployment flavor, scaling level and any additional VNF specific parameters required for instantiation. In order to process this request, the VNFM 666 (See FIG. 6) requires access the VNFD 200 (See FIG. 2) and other optional artifacts that were stored as part of the on-boarding process 800 (see FIG. 8).

Given this, the VNFM 666 (See FIG. 6) looks up the VNFD ID in the VNFI store 904 using the supplied VNFI ID. It then takes the VNFD ID and checks 908 a local VNFD store 910 to see if the VNFD has been retrieved from the VNF catalog 142 (See FIG. 1). If not, then it is retrieved 912 and stored in the VNFD store 910. In one embodiment, VNFD 200 (See FIG. 2) is retrieved from the NFVO 658 (See FIG. 6), which retrieves it from the VNF catalog 142 (See FIG. 1). In another embodiment, the VNFD 200 (See FIG. 2) is retrieved directly from the VNF catalog 142 (See FIG. 1). Likewise, any VNF LCM scripts 222 (See FIG. 2) referenced in the VNFD 200 (See FIG. 2) are retrieved 914 and stored in the VNFD store 910. In some embodiments, the VNFI store 904 and the VNFD store 910 are the same store.

Additionally, each VDU 916 in the VNFD 200 (See FIG. 2) is examined 918 for VNFC Module descriptors 212 (See FIG. 2). For each VNFC module descriptor 920, any VNFC module artifacts needed by the VNFM are retrieved and stored 922 in the VNFD store 910. In step 924 any associated VNFC module LCM scripts 304 (See FIG. 3) are retrieved and stored in the VNFD store 910. Further, in some embodiments, each VNFC module software load 306 (See FIG. 3) referenced in a VNFC module descriptor 300 (See FIG. 3) is also retrieved and stored 926 in the VNFD store 910.

Once all the VNFD artifacts have been retrieved and stored in the VNFD Store 910 or if the VNFD was found to already be in the VNFD store in 908, then the VNFD is examined to see if it includes a VNF LCM script associated with the start instantiation event 928. If so, then the LCM script is retrieved from the VNFD store 910 and executed 930. This script enables a VNFD to customize the behavior of the VNFM 666 (See FIG. 6) at the start of the instantiation process. Once the script has completed execution or if no script was found in step 928 then the resource reservation process 932 can proceed.

Armed with the VNFD 200 (See FIG. 2), deployment flavor, and scaling level, the VNFM 666 (See FIG. 6) coordinates reserving 932 the NFVI 106 (See FIG. 1) resources required to instantiate the VNF instance. In one embodiment, known as the direct mode, the VNFM 666 (See FIG. 6) works directly with one or more VIMs 676 (See FIG. 6) to reserve/allocate the resources. In another embodiment, known as the indirect mode, the VNFM 666 (See FIG. 6) requests the NFVO 658 (See FIG. 6), reserve/allocate the resources by working with one or more VIMs 676 (See FIG. 6).

Given that a VNF 114 (See FIG. 1) may be composed of multiple types of VNFCs 116 (See FIG. 1) and that a VNFI 114 (See FIG. 1) may require one or more VNFCIs 116 (See FIG. 1) of a given type for scaling, fault tolerance, etc., resources must be reserved for one or more VNFCIs 116 (See FIG. 1). Specifically, virtual compute 120 (See FIG. 1), storage 122 (See FIG. 1), and networking 124 (See FIG. 1) resources are reserved for each VNFCI 116 (See FIG. 1). For each VNFCI 116 (See FIG. 1) required for VNF 114 (See FIG. 1) instantiation, a VNFCI ID is generated. This VNFC ID, along with a reference to the associated VNFI record created in step 902 and one or more VIM resource reservations are stored in a VNFCI record in the VNFI store 904.

If resources are able to be successfully reserved for all VNFCIs, then the resource allocation process can begin. Specifically, in accordance with one or more embodiments of the present application, each VNFCI 934 identified in 932 and stored in the VNFI store 904 is instantiated 936. In the first step of this process, the VNFM 666 (See FIG. 6) requests that the VIM 676 (See FIG. 6) associated with the resource reservation allocate the VM/container 938 in accordance with the reservation and given the software image descriptor 210 (See FIG. 2) included in the VDU (VNFC) 200 (See FIG. 2) element of the VNFD 200 (See FIG. 2) persisted in the VNFD store 910. In some embodiments, a reservation ID is provided to the VIM 676 (See FIG. 6) in the allocation request.

Upon receiving the request, the VIM 676 (See FIG. 6) retrieves the software image from the VNF catalog. In some embodiments, the VIM 676 (See FIG. 6) caches VNFC software images locally expedite the deployment process. Once the software image is available to the VIM 676 (See FIG. 6), the VIM 676 (See FIG. 6) requests that the Hypervisor/OS kernel 604 (See FIG. 6) running on the target physical Compute Node 602 (See FIG. 6), allocate the VM/container 606 (See FIG. 6). When this process is complete, the VIM 676 (See FIG. 6) sends a response to the VNFM 666 (See FIG. 6) indicating success or failure.

Upon receiving the response, the VNFM requests that the VIM starts the VM/Container 940 it created in step 938. Upon receiving the request, the VIM 676 (See FIG. 6) requests that the Hypervisor/OS kernel 604 (See FIG. 6) running on the target physical Compute Node 602 (See FIG. 6), start the VM/container 606 (See FIG. 6). When this process is complete, the VIM 676 (See FIG. 6) sends a response to the VNFM 666 (See FIG. 6) indicating success or failure.

Upon receiving the response, the VNFM 666 (See FIG. 6) determines if the VNFC software modules, associated with this type of VNFC, and previously stored (see step 922) in the VNFD store 910 are included in the VNFC software image running in the VM/container 942. In one embodiment, this is check is based on an attribute in the associated VDU 202 (See FIG. 2) in the VNFD stored in the VNFD store 910. In another embodiment, this condition is determined by consulting with an operating system service management subsystem running in the VM/container 606 (See FIG. 6).

In one embodiment, the software image 408 (See FIG. 4) supplied in the VNF package 400 (See FIG. 4) for this VDU (VNFC) 202 (See FIG. 2), includes the VNFC software modules 410-412 (See FIG. 4). The benefit of this embodiment is that it expedites the VNF instantiation process. The downside of this embodiment is that the VNFC software image 408 (See FIG. 4) must be re-generated any time the version of any VNFC software module 410-412 (See FIG. 4) changes. In another embodiment, the software image 408 (See FIG. 4) supplied in the VNF package 400 (See FIG. 4) for this VDU 202 (See FIG. 2) does not include the VNFC software modules 410-412 (See FIG. 4). The benefit of this embodiment is that updates to the VNFC software module 410-412 (See FIG. 4) versions does not require a rebuild of the VDU software image 408 (See FIG. 4). The downside of this embodiment is the VNFC software modules 410-412 (See FIG. 4) are installed after the VM/container 606 (See FIG. 6) are started, thereby slowing down the VNF instantiation process.

Given this, if the VNFC software modules associated with this VNFCI 626 (See FIG. 6) are already installed 942, then the instantiation process for this VNFCI 626 (See FIG. 6), and its underlying software modules 628-630 (See FIG. 6), is complete. At this point, the VNFCI instantiation process moves onto the next VNFCI 944. If not, then the VNFC software modules 946 are installed and started 948. In some embodiments the order that the VNFC software modules 946 are installed and started is determined by an order 308 (See FIG. 3) attribute in the corresponding VNFC Module descriptor 300 (See FIG. 3).

In accordance with one or more embodiments of the present application, the VNFC module software load is retrieved from the VNFD store 910 and transferred 950 into a filesystem accessible to VM/container 606 (See FIG. 6) hosting the VNFCI. In one embodiment, Secure File Transfer Protocol (SFTP) is used for file transfers between the VNFM 666 (See FIG. 6) and the VM/Container 606 (See FIG. 6). In accordance with one or more embodiments of the present application, the VNFC module LCM scripts are retrieved from the VNFD store 910 and transferred 952 into a filesystem accessible to VM/container 606 (See FIG. 6) hosting the VNFCI.

Once the VNFC software module artifacts have been deployed 950-952, the software module can be installed 954 in the VM/container 606 (See FIG. 6) hosting the VNFCI. In one embodiment, VNFCI software module includes a custom LCM install script. In this embodiment, the VNFM requests that the VM/container 606 (See FIG. 6) execute the LCM script. In one embodiment, script and/or command execution requests between the VNFM 666 (See FIG. 6) and the OS 624 (See FIG. 6) running in the VM/Container 606 (See FIG. 6) are made via a secure shell (SSH) connection. In another embodiment, the VNFC software module does not include a custom LCM install script. In this embodiment, a default series of commands between the VNFM 666 (See FIG. 6) and the OS 624 (See FIG. 6) running in the VM/Container 606 (See FIG. 6) are executed in order to install the VNFC software module.

Once the VNFC software module has been installed, the software module can be started 956 in the VM/container 606 (See FIG. 6) hosting the VNFCI. In one embodiment, VNFCI software module includes a custom LCM start script. In this embodiment, the VNFM 666 (See FIG. 6) requests that the VM/container 606 (See FIG. 6) execute the LCM start script. In another embodiment, the VNFC software module does not include a custom LCM start script. In this embodiment, a default command or series of commands between the VNFM 666 (See FIG. 6) and the OS 624 (See FIG. 6) running in the VM/Container 606 (See FIG. 6) are executed in order to start the VNFC software module. Once all the VNFC software modules have been started, the instantiation process for this VNFCI 626 (See FIG. 6), and its underlying software modules 628-630 (See FIG. 6), is complete.

Once all VNFCIs have been instantiated 934, the VNFD is examined to see if it includes a VNF LCM script associated with the end instantiation event 958. If so, then the LCM script is retrieved from the VNFD store 910 and executed 960. This script enables a VNFD to customize the behavior of the VNFM 666 (See FIG. 6) at the end of the instantiation process. Once the script has completed execution or if no script was found in step 958 then the VNFM 666 (See FIG. 6) notifies 962 the NFVO 658 (See FIG. 6) that the instantiation process is complete.

Figure 10:
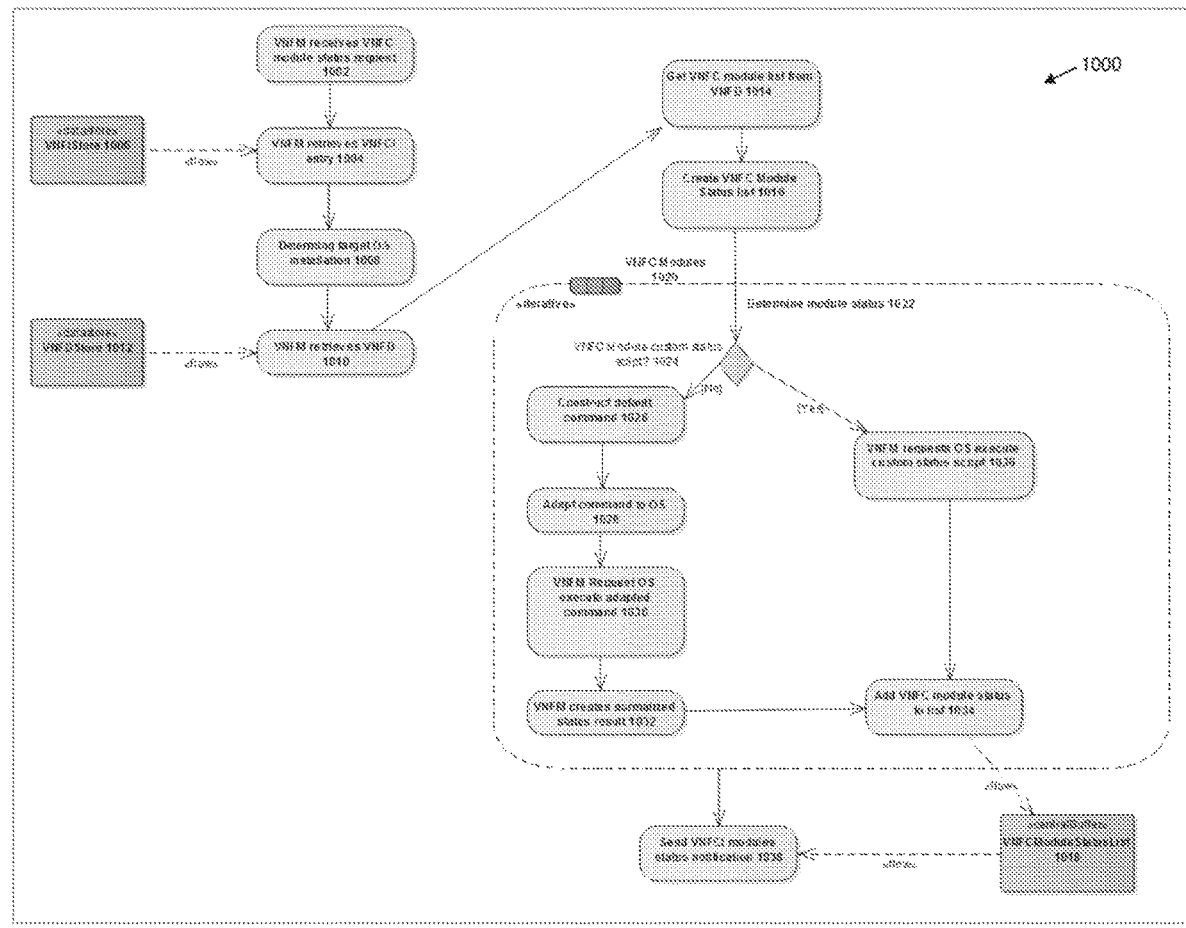
FIG. 10 is a diagram of an embodiment of a VNF module status query flow chart in accordance with one or more embodiments.

In accordance with one or more embodiments of the present application, FIG. 10 illustrates a VNFC status query process 1000 for a VNFC composed of independently manageable software modules. Prior to this process, it is expected that the VNF has been instantiated as described by process 900 (see FIG. 9) or is otherwise functional.

The process starts in step 1002 with a VNFM 666 (See FIG. 6) receiving a VNFC module status request. This request may come from an NFVO 658 (See FIG. 6), an EMS 642 (See FIG. 6), or a monitoring subsystem from within the VNFM 666 (See FIG. 6). The status request includes, but is not limited to, the ID of the VNF instance (VNFI) and the ID of the target VNFC instance 626 (See FIG. 6) that is part of the VNFI.

After receiving the request, the VNFM retrieves 1004 the VNFCI entry from a VNFI store 1006, which stores all VNFI data, which is initially populated when a VNF is instantiated 900 (See FIG. 9). The VNFM 666 (See FIG. 6) then determines the target OS installation 1008 of the status request by examining the VNFCI entry which includes a reference to the hosting VM/container 606 (See FIG. 6) and the OS installation 624 (See FIG. 6) within it. Further, the VNFCI entry includes a reference to the VNFI entry which contains a reference to the VNFD, which is retrieved in step 1008 from the VNFD store 1012. The VNFC module list is then retrieved 1014 from the VNFC module descriptors 212 (See FIG. 2) in the VNFD 200 (See FIG. 2).

Before getting the status of each module, a status list 1018 is created 1016 to hold the results which is ultimately sent back in the response. Each status will include but is not limited to, the ID of the VNFC module and one or more planes of state. For example, the planes of state may include an administrative state and an operational state. In some embodiments, the ID of the module is the value in the ID field 302 (See FIG. 3) of the corresponding VNFC module descriptor 300 (See FIG. 3).

For each VNFC module 1020 identified in step 1014, the status of the VNFC module is determined 1022. This process starts by checking to see if the module includes a custom LCM status script 1024 as per the VNFCI module descriptor 300 (See FIG. 3). If not, then a default status command is constructed which specifies the ID of the module 1026. The VNFM then examines the version of the OS installation 624 (See FIG. 6) determined in step 1008 and based on that plugs in an adaptor which adapts 1028 the command to match the service management framework delivered with the OS installation 624 (See FIG. 6). In one embodiment, that service management framework is Systemd. In another embodiment, the service management framework is Upstart. In some embodiments that use a Windows operating system variant, it is Windows service manager.

Once the command has been adapted for the target, the VNFM requests that the OS installation running in the VM/Container executes it 1030. In one embodiment, command execution requests between the VNFM 666 (See FIG. 6) and the OS 624 (See FIG. 6) running in the VM/Container 606 (See FIG. 6) are made via a secure shell (SSH) connection. In some embodiments, a connection between the VNFM 666 (See FIG. 6) and the OS 624 (See FIG. 6) is established on an as needed basis. In some embodiments, these connections are maintained for a configurable period of time.

In accordance with one or more embodiments of the present application, the command is executed synchronously, and a status result is returned. In some embodiments, the status result includes one or more planes of state. The OS adaptor identified in step 1026 is used to create a normalized status result 1032 to be included in the notification. In one embodiment, the original, non-adapted status is also included in the normalized status result. In step 1034, the normalized status result is added to the module status list 1018 and the cycle repeats for each remaining VNFC module 1020.

In accordance with one or more embodiments of the present application, if the module includes a custom LCM status script 1024 as per the VNFCI module descriptor 300 (See FIG. 3), the VNFM requests that the OS installation running in the VM/Container executes 1036 the script, which was previously installed 954 (See FIG. 9) when the VNF was instantiated 900 (See FIG. 9), and passes in the ID of the module. It is expected that the script is executed synchronously, and a status result is returned. It is further expected that the returned status result is normalized for inclusion in the notification as the custom script understands the adaptation required. As before, in step 1034, the normalized status result is added to the module status list 1018 and the cycle repeats for each remaining VNFC module 1020.

Once the status of all of the modules has been gathered and stored in the module status list 1018, the VNFM 666 (See FIG. 6) builds a VNFCI status notification that includes the data in the module status list 1018 and sends it to the entity that requested the status in 1002.

Figure 11:
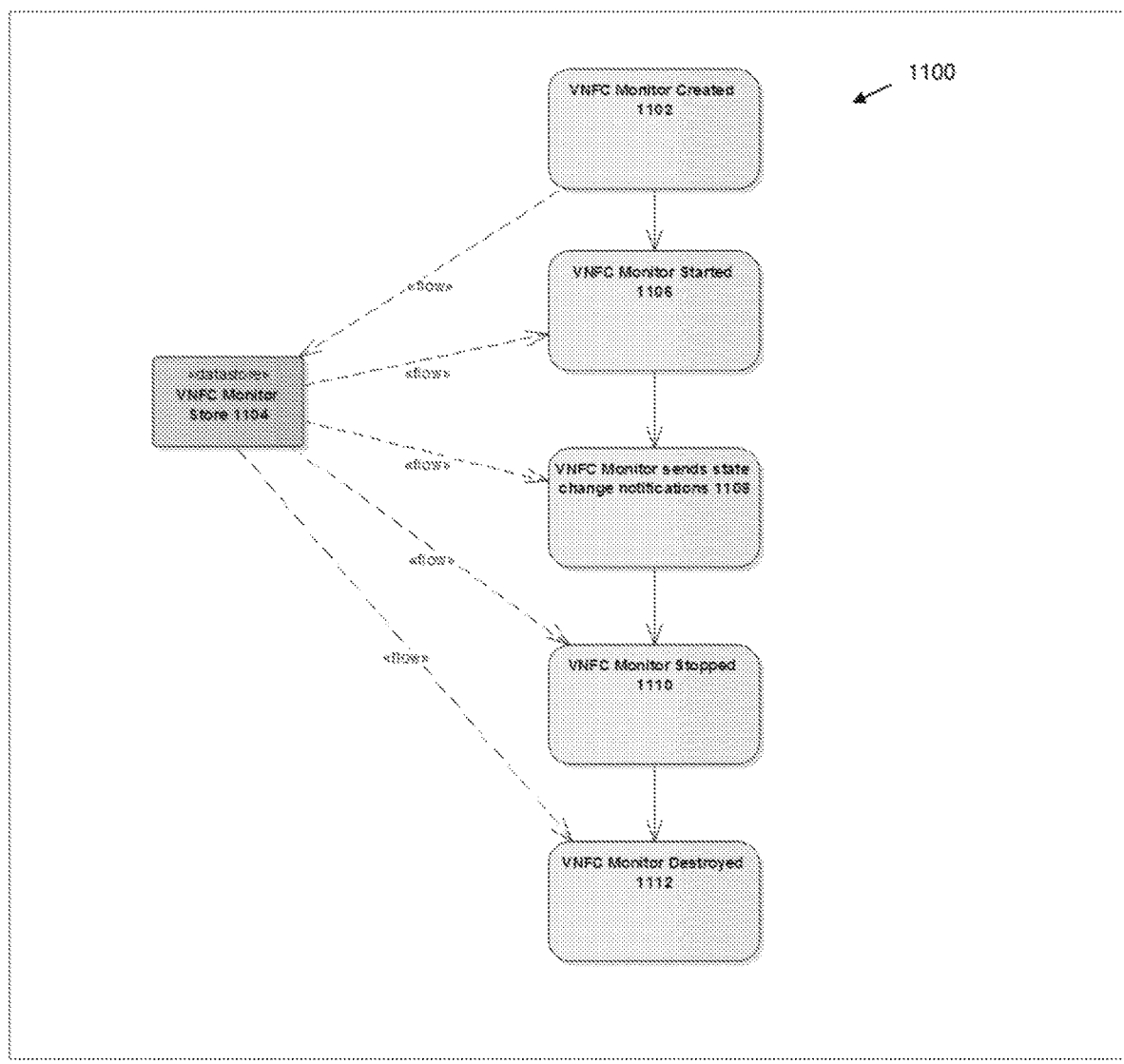
FIG. 11 is a diagram of an embodiment of a VNFC module status monitoring flow chart in accordance with one or more embodiments.

In accordance with one or more embodiments of the present application, FIG. 11 illustrates a VNFC status monitoring process 1100 for a VNFC composed of independently manageable software modules. Prior to this process, it is expected that the VNF has been instantiated as described by process 900 (see FIG. 9) or is otherwise functional.

The process starts in step 1102 with a VNFM 666 (See FIG. 6) receiving a VNFC monitor creation request. In some embodiments, a monitoring subsystem in the VNFM implements this process. Typically, this type of request will originate from a management element, such as an NFVO or an EMS 642 (See FIG. 6), that works with a user interface component which displays VNFC module states. The creation request includes, but is not limited to, the ID of the VNF instance (VNFI) and the ID of the target VNFC instance 626 (See FIG. 6) that is part of the VNFI. Upon receiving the request, the VNFM creates a VNFC monitor, generates a unique ID for it and stores it in the monitor. Additionally, the request originator, the VNFI ID, and the target VNFC IDs are stored in it. Further, the monitor includes a last known status attributes, which is initially empty. After the monitor is created, the monitor is added to a VNFC Monitor store 1104 using its ID as they key. In a preferred embodiment, the monitor store 1104 is stored in Random Access Memory (RAM) for efficient access. Once stored, the VNFM sends a response which includes the monitor ID.

Once a monitor has been created the VNFM 666 (See FIG. 6) may receive a VNFC start monitor request which includes the monitor ID returned in step 1102. In some embodiments, the request may also include a polling frequency parameter. Receipt of this request prompts the VNFM 666 (See FIG. 6) to lookup the monitor in the VNFC Monitor store 1104 and start the monitor 1106. In some embodiments, starting the monitor results in a polling timer getting created and started. In some embodiments, the timer expiration setting is determined by a polling frequency supplied in the Start VNFC monitor request. In a polling embodiment, when the timer expires a VNFC status request may be issued within the VNFM 666 (See FIG. 6). In some embodiments, the VNFM uses a VNFC status query process, such as the one depicted in 1000 (See FIG. 10). Further, when the timer expires, it is restarted to prompt the next status poll.

Upon receipt of a status query response, the VNFM 666 (See FIG. 6) looks up the monitor in the VNFC Monitor store 1104 and then compares the last known VNFCI module status, to the current status included in the response. If any component of the status has changed, then a VNFC monitor status change notification is built with the current status and sent to the originator of the monitor 1108. Further, the current status is copied into the last known status attribute of the monitor. If no components of the status have changed, then the monitor does not take any action until the next timer expiry.

Once a monitor has been started, the VNFM 666 (See FIG. 6) may receive a VNFC stop monitor request which includes the monitor ID returned in step 1102. Receipt of this request prompts the VNFM to lookup the monitor in the VNFC Monitor store 1104 and stop the monitor 1110. In some embodiments stopping the monitor results in the polling timer being stopped and destroyed. Additionally, in some embodiments, the last known state attribute is cleared.

Once a monitor has been stopped, the VNFM 666 (See FIG. 6) may receive a VNFC destroy monitor request which includes the monitor ID returned in step 1102. Receipt of this request prompts the VNFM to lookup the monitor in the VNFC Monitor store 1104 and destroy the monitor 1112. In some embodiments destroying the monitor results in the monitor being removed from the VNFC monitor store 1104 and deleted.

What is claimed is:

1. A system, comprising:
a Virtual Network Function Manager (VNFM) in communication with a management element and a Virtual Network Function Component (VNFC) comprising a plurality of independently manageable VNFC modules, the VNFM being configured to:
receive, from the management element, a VNFC module status request including an identification (ID) of a VNFC instance (VNFCI);
determine a specific target operating system (OS) installation of the VNFCI based on a VNFCI data entry from a VNFI data store;
retrieve a list of two or more independently manageable VNFC modules of the VNFCI;
determine a status of each of the two or more independently manageable VNFC modules, wherein, when determining the statuses, the VNFM is configured to, for each corresponding VNFC module of the two or more independently manageable VNFC modules:
construct a default status command based on the determined status of a corresponding VNFC module of the two or more independently manageable VNFC modules,
adapt the default status command to the specific target OS installation,
send, to the VNFCI, a request to execute the adapted status command; and
receive, from the VNFCI, a status result; and
send, to the management element, a VNFC module status notification, including a normalized status result for each of the two or more independently associated manageable VNFC modules, where each normalized status result is based on a corresponding status result.

2. The system of claim 1, wherein when the VNFM is configured to determine a status of each of the two or more independently manageable VNFC modules, the VNFM is further to:
sequentially determine a status of each remaining independently manageable VNFC module of the two or more independently manageable VNFC modules.

3. The system of claim 1, wherein the VNFCI data entry includes an OS version installed in a Virtual Machine (VM)/container that hosts the VNFCI.

4. The system of claim 1, wherein the VNFCI data entry includes the list.

5. The system of claim 1, wherein, when the VNFM is configured to adapt the default status command to the specific target OS installation, the VNFM is further configured to:
   adapt the default status command to match a system management framework of the specific target OS installation.

6. The system of claim 1, wherein, when the VNFM is configured to request to execute the adapted status command, the VNFM is further configured to:
   request a secure connection between the VNFM and the OS on a virtual machine (VM)/container that hosts the VNFCI.

7. The system of claim 1, wherein the secure connection is maintained for a certain time period.

8. A method performed by a Virtual Network Function Manager (VNFM) in communication with a management element and a Virtual Network Function Component (VNFC) comprising a plurality of independently manageable VNFC modules, the method comprising:
   receiving, from the management element, a VNFC module status request that includes an identification (ID) of a VNFC instance (VNFCI);
   determining a specific target operating system (OS) installation of the VNFCI based on a VNFCI data entry from a VNFI data store;
   retrieving a list of two or more independently manageable VNFC modules of the VNFCI;
   determining a status of each of the two or more independently manageable VNFC modules, wherein, when determining the statuses, the method further comprises, for each corresponding VNFC module of the two or more independently manageable VNFC modules:
      constructing a default status command based on the determined status of a corresponding VNFC module of the two or more independently manageable VNFC modules,
      adapting the default status command to the specific target OS installation,
      sending, to the VNFCI, a request for execution of the adapted status command;
      receiving, from the VNFCI, a status result; and
   sending, to the management element, a VNFC module status notification, including a normalized status result for each of the two or more independently associated manageable VNFC modules, where each normalized status result is based on a corresponding status result.

9. The method of claim 8, wherein the determining a status of each of the two or more independently manageable VNFC modules further comprises:
   sequentially determining a status of each remaining independently manageable VNFC module of the two or more independently manageable VNFC modules.

10. The method of claim 8, wherein the VNFCI data entry includes an OS version installed in a Virtual Machine (VM)/container that hosts the VNFCI.

11. The method of claim 8, wherein the VNFCI data entry includes the list.

12. The method of claim 8, wherein the adapting the default status command to the specific target OS installation further comprises:
   adapting the default status command to match a system management framework of the specific target OS installation.

13. The method of claim 8, wherein the executing the adapted status command further comprises:
   requesting a secure connection between the VNFM and the OS on a virtual machine (VM)/container that hosts the VNFCI.

14. The method of claim 8, wherein the secure connection is maintained for a certain time period.

15. A non-transitory computer readable medium storing one or more instructions that when read by a processor cause the processor to perform:
   receiving, by a Virtual Network Function Manager (VNFM) in communication with a management element and a Virtual Network Function Component (VNFC) comprising a plurality of independently manageable VNFC modules, a VNFC module status request from the management element, the status request including an identification (ID) of a VNFC instance (VNFCI);
   determining, by the VNFM, a specific target operating system (OS) installation of the VNFCI based on a VNFCI data entry from a VNFI data store;
   retrieving, by the VNFM, a list of two or more independently manageable VNFC modules of the VNFCI;
   determining, by the VNFM, a status of each of the two or more independently manageable VNFC modules, wherein, when determining the statuses, the one or more instructions further cause the processor to perform, for each corresponding VNFC module of the two or more independently manageable VNFC modules:
      constructing a default status command based on the determined status of a corresponding VNFC module of the two or more independently manageable VNFC modules,
      adapting the default status command to the specific target OS installation,
      sending, to the VNFCI, a request for execution of the adapted status command, and
      receiving, from the VNFCI, a status result; and
   sending, to the management element, a VNFC module status notification, including a normalized status result for each of the two or more independently associated manageable VNFC modules, where each normalized status result is based on a corresponding status result.

16. The non-transitory computer readable medium of claim 15, wherein the determining a status of each of the two or more independently manageable VNFC modules further comprises:
   sequentially determining a status of each remaining independently manageable VNFC module of the two or more independently manageable VNFC modules.

17. The non-transitory computer readable medium of claim 15, wherein the VNFCI data entry includes an OS version installed in a Virtual Machine (VM)/container that hosts the VNFCI.

18. The non-transitory computer readable medium of claim 15, wherein the VNFCI data entry includes the list.

19. The non-transitory computer readable medium of claim 15, wherein, when the one or more instructions cause the processor to perform the adapting the default status command to the specific target OS installation, the one or more instructions further cause the processor to perform:
   adapting the default status command to match a system management framework of the specific target OS installation.

20. The non-transitory computer readable medium of claim 15, wherein, when the one or more instructions cause the processor to perform the executing of the adapted status command, the one or more instructions further cause the processor to perform:

requesting a secure connection between the VNFM and the OS on a virtual machine (VM)/container that hosts the VNFCI.

* * * * *